United States Patent [19]

Edwards et al.

[11] Patent Number: 4,712,957
[45] Date of Patent: Dec. 15, 1987

[54] ADHESIVELY SECURED FASTENER

[76] Inventors: Wayne Edwards, 125 Country Club Dr.; Richard V. Nation, 5610 Lenwood Cir., both of Sanford, Fla. 32771; Keith A. Tomkins, 621 Oakmont Ave., Sorrento, Fla. 32776

[21] Appl. No.: 807,520
[22] Filed: Dec. 11, 1985
[51] Int. Cl.[4] .............................................. F16B 39/02
[52] U.S. Cl. .................................... 411/82; 411/258; 411/418
[58] Field of Search ............... 411/82, 258, 417, 418, 411/419, 420, 421, 395, 23, 69, 508–510; 156/91; 405/261

[56] References Cited

U.S. PATENT DOCUMENTS

| 1,000,280 | 8/1911 | Messenger | 411/418 |
| 3,140,967 | 7/1964 | Kaufmann | 156/91 |
| 3,240,379 | 3/1966 | Bremer | 411/82 X |
| 3,472,301 | 10/1969 | Pearce | 411/258 |
| 4,370,372 | 1/1983 | Higgins | 411/23 X |
| 4,514,125 | 4/1985 | Stol | 411/258 X |

FOREIGN PATENT DOCUMENTS

| 2515950 | 10/1976 | Fed. Rep. of Germany | 411/258 |
| 385906 | 5/1908 | France | 411/421 |
| 783579 | 9/1957 | United Kingdom | 411/258 |

OTHER PUBLICATIONS

Williamson, "Self-Locking Screw", Feb. 1962, *IBM Technical Disclosure Bulletin*, p. 2.

Primary Examiner—Robert L. Wolfe
Assistant Examiner—Suzanne L. Dino
Attorney, Agent, or Firm—Duckworth, Allen & Dyer

[57] ABSTRACT

A fastener assembly in which a fastener is adhesively secured within a borehole. A fastener having a shank with longitudinal channels is inserted within a borehole. A fluent adhesive is forced along the longitudinal channels of the fastener to occupy the space within the bore adjacent to the fastener. The adhesive is permitted to harden in situ so as to provide a strong chemo-mechanical bond.

3 Claims, 9 Drawing Figures

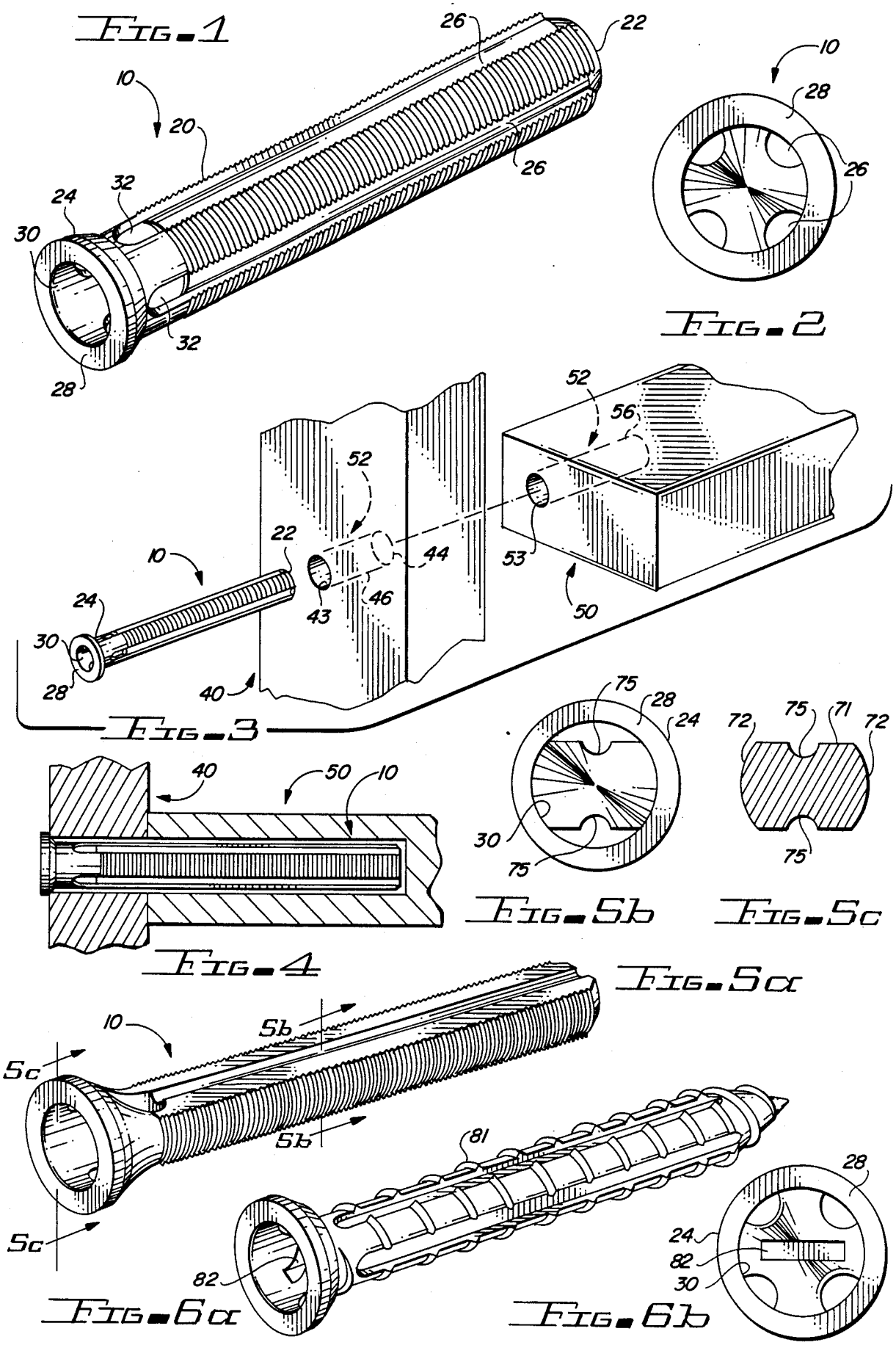

ADHESIVELY SECURED FASTENER

BACKGROUND OF THE INVENTION

This invention relates to fasteners and, more particularly, to an adhesively secured fastener.

The prior art has encountered very serious difficulties when it is desired to fasten friable structures together. The principle behind fasteners such as nails and screws is development of intense but directionally controlled forces between them and the components they are designed to fasten together. This translates into reliance for the fastening function upon the resultant frictional forces between the fastener and the component. The friable material inelastically deforms, as the frictional forces of the fastener act upon it, reducing frictional forces between the fastener and friable material. As a result the fastener is no longer able to secure the structure.

There have been suggestions in the prior art for introducing adhesives to the fastener assembly to increase the fastening strength. The fastening strength is increased because of the chemically induced cohesive forces associated with adhesives.

In U.S. Pat. No. 4,514,125, Stol discloses a fastener including introduction of a capsule of adhesive into a porous basket hung in a bore for activation by fastener installation. In that patent, an adhesive capsule support basket is placed at a desired level into a bore which is about to receive a fastener such as a bolt or screw. A capsule containing adhesive is inserted into the bore and becomes supported by the basket. As the fastener is installed, it contacts and bursts the capsule, spreading the adhesive at the fastening region. A disadvantage of this method consists in that the amount of adhesive which is spread throughout the bore hole is limited to the amount of adhesive within the capsule. Thus, if the attachment of porous structures is desired, the adhesive may not be able to fill the pits and voids required to ensure a satisfactory bond.

U.S. Pat. No. 4,370,372 to Higgins et al discloses a method of joining honeycomb panels using a fastener element. In the arrangement disclosed by this patentee, a hollow tubular fastener with side apertures is inserted through aligned bores in the honeycomb panels. A fluent adhesive is forced into the fastener so that some of the adhesive extrudes through the side apertures to occupy adjacent space in the cellular structures of both panels, thus permanently bonding the honeycomb panels. A disadvantage of this method consists in that the fastener is limited to the bonding of highly porous material. If the fastener is used for bonding nonporous material such as metal or semiporous material such as wood or concrete, the apertures will be blocked by the relatively smooth sidewalls of the bored material. Thus, adhesive forced into the fastener will not extrude through the side apertures and no chemo-mechanical bond will form.

SUMMARY OF THE INVENTION

The present invention teaches a cylindrical fastener for joining two pieces of material. The cylindrical fastener has longitudinal channels and is inserted through aligned bores within the material to be fastened. A fluent adhesive is forced into the longitudinal channels under a sufficient pressure so that the adhesive occupies the space adjacent to the fastener and the fastened material.

The system of the present invention is conducive to attaching porous panels, since adhesive forced into the longitudinal channels fills the pits and voids of the panels along with the channels of the fastener. The present invention is also suitable for attaching non-porous panels. Since the channels in which the adhesive is forced are on the external surface of the fastener, the sidewalls of the bored material cannot block the flow of the adhesive through the channels. Additionally, the system of the present invention is suitable for attaching non-porous panels to porous panels and vice versa.

In accordance with a preferred embodiment of the present invention the cylindrical fastener has a leading end and a trailing end. The leading end is inserted through a bore in the first panel and into a bore in the second panel. On the trailing end of the fastener is a head, which, when the fastener is inserted into the panels, either protrudes slightly from the first panel or is flush with the first panel. An axial cavity through the head of the fastener communicates with the longitudinal channels so that the adhesive can be forced into the longitudinal channels by way of the cavity.

In an illustrative embodiment the leading end of the fastener is tapered to increase the ease of inserting the fastener into the bores. Additionally the surface of the fastener is axially knurled so the adhesive which is forced through the longitudinal grooves will cling to the ridges thus increasing the chemo-mechanical bond.

BRIEF DESCRIPTION OF THE DRAWING

The foregoing and other objects, features and advantages of the invention will become more apparent by reference to the accompanying drawings and the following detailed description taken in conjunction with the accompanying drawing in which:

FIG. 1 is a perspective view of a fastener in accordance with the present invention;

FIG. 2 is an end elevation view of the trailing end of a fastener in accordance with the present invention;

FIG. 3 is a perspective view of a fastener in accordance with the present invention in addition to panels into which the fastener will be inserted;

FIG. 4 is a plan view of a fastener assembly attached to two panels in accordance with the present invention;

FIG. 5a is a perspective view of a modified fastener with two flat sides;

FIG. 5b is a cross-sectional view 5b—5b of the fastener in FIG. 5a;

FIG. 5c is an end elevation view of the trailing end of the fastener in FIG. 5a;

FIG. 6a is a perspective view of a modified fastener with screw threads;

FIG. 6b is an elevation view of the trailing end of the fastener in FIG. 6a.

DESCRIPTION OF THE PREFERRED EMBODIMENT

A detailed description of the preferred embodiment of the present invention will now be described with reference to FIG. 1. The cylindrical fastener of the present invention, referred to generally with the reference numeral 10, has a cylindrical shank 20 with a leading end 22 and a trailing end 24. The shank 20 is provided with one or more external longitudinal channels 26. A flat head 28 is on the trailing end of the fastener 10. An axial cavity 30 through the head 28 of the fastener 10 communicates with the external longitudinal channels 26 by way of apertures 32 through each channel 26. Preferably the fastener 10 is made of aluminum, steel or other material having sufficient tensile strength to support the bond.

FIGS. 3 and 4 show a first and second panel held together by the fastener 10 of the present invention. The first panel 40 has a through bore 42 which defines a mouth 43, an axially extending sidewall 46 and an exit 44. The second panel 50 has a bore 52 defining a mouth 53 and an axially extending sidewall 56. The leading end 22 and shank 20 of the fastener 10 are inserted through the mouth 43 defined by the bore 42 within the first panel 40, and into the aligned bore 52 within the second panel 50. When the fastener 10 is inserted into the adjacent panels 40 and 50 through the aligned bores 42 and 52, the head 28 on the trailing end 24 of the fastener is adjacent to the mouth 43 defined by the bore 42 within the first panel 40. With the fastener 10 in place a fluent glue-type adhesive appropriately selected to accomodate the particular type material to be bonded, is forced into the axial cavity 30 in the head 28 of the fastener 10 and flows through the apertures 32 and into the longitudinal channels 26, thus filling the space adjacent to the fastener 10 and the panels. When the adhesive hardens, a strong chemo-mechanical bond is formed.

In a preferred embodiment of the present invention, the cylindrical shank 20 of the fastener has a knurled surface which forms a plurality of circumferential ridges 34 so that the adhesive can flow between the ridges to increase the chemo-mechanical bond of the fastener 10.

Additionally, in a preferred embodiment of the present invention, the leading end 22 of the fastener 10 is tapered so that the fastener is easier to insert through the panels. Preferably, there are four longitudinal channels 26 equally spaced along the surface of the cylindrical shank 20, to ensure an even disbursement of the adhesive.

A further embodiment of the present invention is shown in FIG. 5. Here, the cylindrical body 20 of the fastener 10 has longitudinal grooves 75 within longitudinal flat sides 71. The radial cross section of the cylindrical body 20 is in the form of a modified rectangle with two parallel flat sides 71 and two convex arc-shaped sides 72. When the adhesive is injected into a cavity 30 through the head 28 of the fastener 10, the adhesive flows along the flat sides 71 of the fastener 70 as well as the longitudinal grooves 75 and fills the space adjacent to the fastener 10 and the panels to which the fastener is inserted. Preferably, a plurality of through bores 72 penetrate the flat sides 71 of the fastener 10 so that the adhesive can flow into the bores 72 to increase the chemo-mechanical bond of the fastener 10.

A still further embodiment of the present invention is shown in FIG. 6. In this embodiment the cylindrical shank 20 of the fastener 10 has a screw thread 81 on the surface of the shank 20. Additionally, the fastener 10 has a slot 82 in the trailing end 24 of the fastener 10 so that a tool, such as a screwdriver, can be inserted through the axial cavity 30 and communicate with the slot 82. The fastener 10 can then be screwed into the panels without the need of creating a bore in the panels prior to insertion of the panels. After the fastener 10 is in place adhesive can be injected through the cavity 30 and flow along the longitudinal channels 26 to occupy the space between the fastener 10 and the panels.

While the principals of the invention have now been made clear in an illustrative embodiment, there will become obvious to those skilled in the art many modifications in structure, arrangement, portions, materials and components used in the practice of the invention and otherwise which are particularly adapted for specific operating requirements without departing from those principals. The appended claims are therefore intended to cover and embrace any such modifications, within the limits only of the true spirit and scope of the invention.

We claim:

1. A fastener in which a fluent adhesive is introduced for fastening material, said fastener comprising:
   (a) a solid shank having a leading end and a trailing end;
   (b) at least one peripherally longitudinal channel along said shank;
   (c) a head on said trailing end of said fastener;
   (d) an axial cavity through said head defining a mouth, an axially extending sidewall and an inner end;
   (e) apertures through said sidewalls, said apertures communicating with said at least one longitudinal channel for introducing adhesive through said head and into said channel; and
   (f) at least one longitudinal flat surface extended along said shank from said trailing end to said leading end, said channel being formed in said flat surface.

2. A fastening assembly for fastening material comprising:
   (a) a fastener having a solid shank, a leading end, a trailing end and at least one longitudinal flat surface extending along said shank;
   (b) an adhesive;
   (c) means on said trailing end for permitting insertion of said adhesive about said longitudinal flat surfaces so that said adhesive contacts both said shank of said fastener and a material to be fastened, said means for permitting insertion of said adhesive comprising a head on said trailing end of said fastener, and axial cavity through said head defining a mouth, an axially extending sidewall and an inner end, in at least one aperture through said inner end defined by said axial cavity communicating with said at least one longitudinal flat surface; and
   (d) a peripherally longitudinal channel along said longitudinal flat surface.

3. A fastening assembly according to claim 2 further comprising a plurality of through bores which penetrate said longitudinal channel.

* * * * *